(12) United States Patent
Hirose et al.

(10) Patent No.: US 10,969,319 B2
(45) Date of Patent: Apr. 6, 2021

(54) APPARATUS FOR AND METHOD OF MASS ANALYSIS

(71) Applicant: HITACHI HIGH-TECH SCIENCE CORPORATION, Tokyo (JP)

(72) Inventors: Ryusuke Hirose, Tokyo (JP); Hideyuki Akiyama, Tokyo (JP); Noriaki Sakai, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 266 days.

(21) Appl. No.: 16/041,623

(22) Filed: Jul. 20, 2018

(65) Prior Publication Data

US 2019/0025173 A1  Jan. 24, 2019

(30) Foreign Application Priority Data

Jul. 21, 2017  (JP) .................. 2017-142236

(51) Int. Cl.
  *G01N 5/04*  (2006.01)
  *G01N 25/20*  (2006.01)
(52) U.S. Cl.
  CPC .............. *G01N 5/04* (2013.01); *G01N 25/20* (2013.01)
(58) Field of Classification Search
  None
  See application file for complete search history.

(56) References Cited

U.S. PATENT DOCUMENTS

| 9,899,198 B2 * | 2/2018 | Akiyama ............ H01J 49/0009 |
| 2013/0298639 A1 * | 11/2013 | Blumm .............. G01N 25/4846 73/25.01 |

FOREIGN PATENT DOCUMENTS

JP            07-260663 A    10/1995

* cited by examiner

*Primary Examiner* — Daniel S Larkin
(74) *Attorney, Agent, or Firm* — Holland & Hart LLP (57) ABSTRACT

The apparatus for mass analysis includes: a heating unit heating a sample containing a first substance and a second substance having different gasification temperatures to evolve gas components; a heating control unit controlling the heating unit to heat the sample at a first temperature point at which gas of the first substance is evolved and gas of the second substance is not evolved, until reaching a first time point, whereafter the heating unit is controlled to heat the sample until reaching a second temperature point at which gas of the second substance is evolved; and an analysis control unit performing mass analysis under a first measurement condition assigned to the first substance until reaching the first time point at the first temperature point, and performing mass analysis under a second measurement condition assigned to the second substance at the second temperature point.

4 Claims, 7 Drawing Sheets

APPARATUS FOR AND METHOD OF MASS ANALYSIS

CROSS REFERENCE TO RELATED APPLICATION

This application claims priority to and the benefit of Japanese Patent Application No. 2017-142236, by HIROSE et al., filed Jul. 21, 2017, which is hereby incorporated by reference in its entirety into this application.

BACKGROUND OF THE INVENTION

1. Technical Field

The present invention relates generally to an apparatus for and a method of mass analysis.

2. Description of the Related Art

In a case of heating a plurality of restricted substances (for example, phthalate esters, a brominated flame retardant substance, etc.) contained in a resin and analyzing gas components thereof, the fact that a gasification temperature is different for each substance to be measured is used. Specifically, after heating the substances at a temperature suitable for gasification of phthalate having a low gasification temperature and performing mass analysis, the temperature is raised in accordance with a brominated flame retardant substance having a high gasification temperature, and mass analysis is sequentially performed.

In addition, a technique for mass analysis of gas evolved by thermogravimetry has also been developed (Patent Document 1). In the technique, in order to improve a resolving power of thermogravimetry, a heating rate is continuously changed in accordance with a weight change rate of the sample.

DOCUMENTS OF RELATED ART (Patent Document 1) Japanese Patent Application No. H7-260663

SUMMARY OF THE INVENTION

In mass analysis of restricted substances, performing measurement is required in a short time. However, a method of evolving gas by thermogravimetry has a complicated heating pattern and takes time to measure.

Meanwhile, when heating time is too short, phthalates and a brominated flame retardant substance are present together and gasified, whereby it is difficult to separate and analyze the phthalates and the brominated flame retardant substance.

Accordingly, the present invention has been made keeping in mind the above problems occurring in the related art, and an object of the present invention is to provide an apparatus for and a method of mass analysis, the apparatus and the method capable of performing mass analysis of two or more substances having different gasification temperature in a short time.

In order to accomplish the above object, the present invention provides an apparatus for mass analysis, the apparatus including: a heating unit heating a sample containing a first substance and a second substance which gasifies at a higher temperature compared to the first substance to evolve gas components which are detected by the apparatus for mass analysis; a heating control unit controlling the heating unit to heat the sample at a first temperature point at which gas of the first substance is evolved and gas of the second substance is not evolved, until reaching a first time point, whereafter controlling the heating unit to heat the sample until reaching a second temperature point at which gas of the second substance is evolved, the first temperature point and the first time point being obtained beforehand; and an analysis control unit performing mass analysis under a first measurement condition assigned to the first substance until reaching the first time point at the first temperature point, and performing mass analysis under a second measurement condition assigned to the second substance at the second temperature point.

According to the apparatus for mass analysis, the first temperature point and the first time point are obtained in advance at which gas of the first substance is evolved and gas of the second substance is not evolved, and then the heating unit is controlled to heat the sample at the first temperature point until reaching the first time point such that the gas component of the first substance can be mass-analyzed without the second substance. Then, the heating unit is controlled to heat the sample until reaching the second temperature point at which gas of the second substance is evolved such that a gas component of the second substance can be mass-analyzed after the gas of the first substance has been completely released.

Thus, two or more substances having different gasification temperatures can be mass-analyzed in a short time according to a heating pattern obtained beforehand.

In addition, when a sample contains impurities different from the first substance and the second substance having a gasification temperature equal to or below the first temperature point, the impurities can be removed at the first temperature point whereby the second substance can be analyzed more reliably. Examples of the impurities may include a resin, which is a matrix when the sample is a resin.

When the analysis control unit performs mass analysis of the first substance under the first measurement condition, the first time point may be determined to be a point at which a peak intensity of the first substance is equal or less than a predetermined threshold value.

For example, there is a possibility that the gas of the first substance is not completely evolved even after the first time point obtained beforehand due to fluctuations in the measurement conditions. Therefore, when the peak intensity of the first substance exceeds the threshold value during mass analysis according to the apparatus for mass analysis, first time point is extended until the peak intensity of the first substance is lower than the threshold value, whereby the first substance can be analyzed more reliably.

On the other hand, when time until the peak intensity becomes less than the threshold value is shorter than the first time point, the measurement time can be shortened.

The first substance may be phthalate ester and the second substance may be bromide.

A method of mass analysis of the present invention uses an apparatus provided with a heating unit heating a sample containing a first substance and a second substance which gasifies at a higher temperature compared to the first substance to evolve gas components which are detected by the apparatus for mass analysis, the method including: a heating control process in which the heating unit is controlled to heat the sample at a first temperature point at which gas of the first substance is evolved and gas of the second substance is not evolved, until reaching a first time point, and when over the first time point, the heating unit is controlled to heat the sample until reaching a second temperature point at which gas of the second substance is evolved, the first temperature point and the first time point obtained beforehand; and an analysis control process in which mass analysis is performed under a first measurement condition assigned to the first substance until reaching the first time point at the first temperature point, and mass analysis is performed under a second measurement condition assigned to the second substance at the second temperature point.

According to the present invention, two or more substances having different gasification temperatures can be mass-analyzed in a short time.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
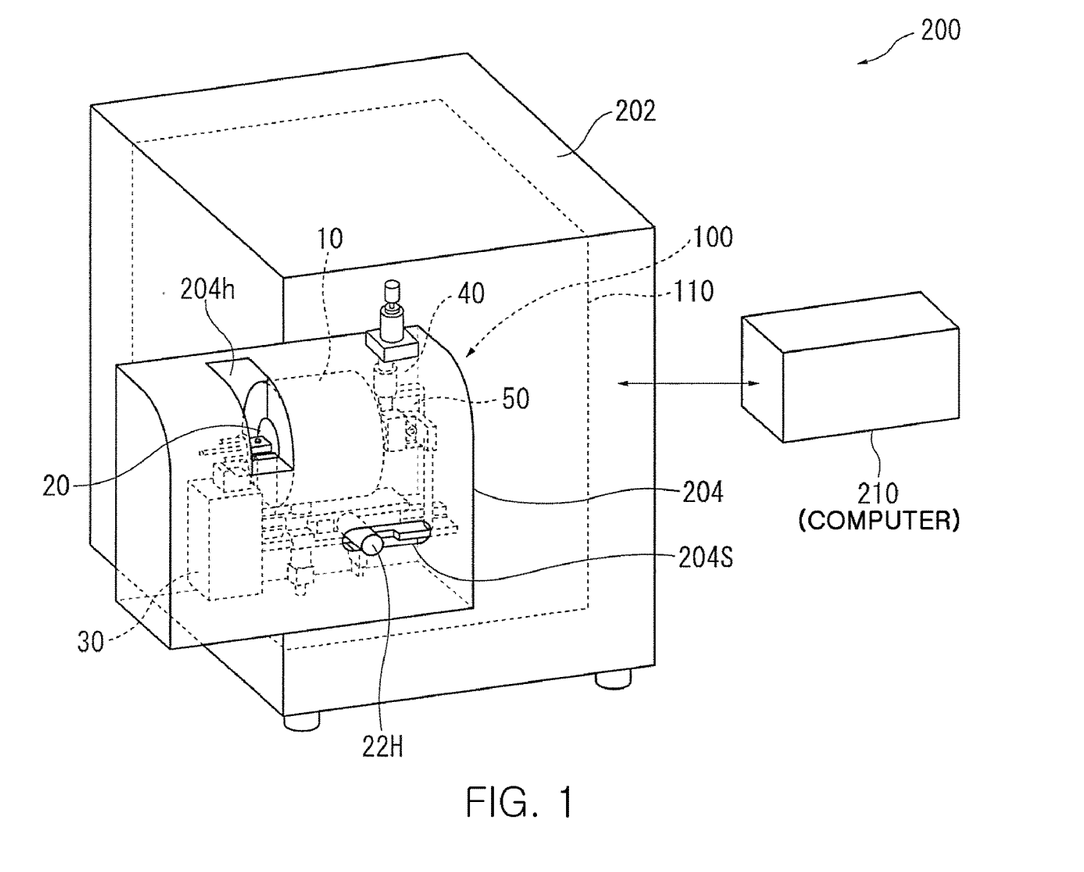
FIG. 1 is a perspective view showing a configuration of an apparatus for mass analysis according to an embodiment of the present invention.
Figure 2:
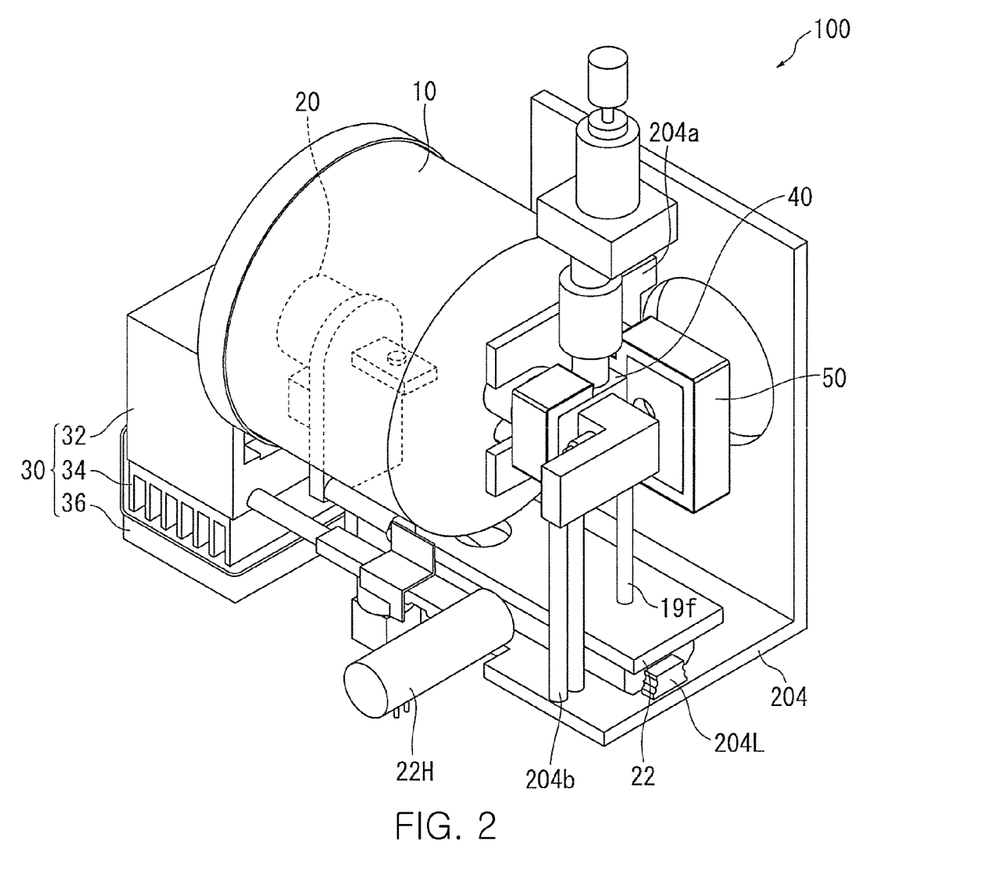
FIG. 2 is a perspective view showing a configuration of a gas evolving unit.
Figure 3:
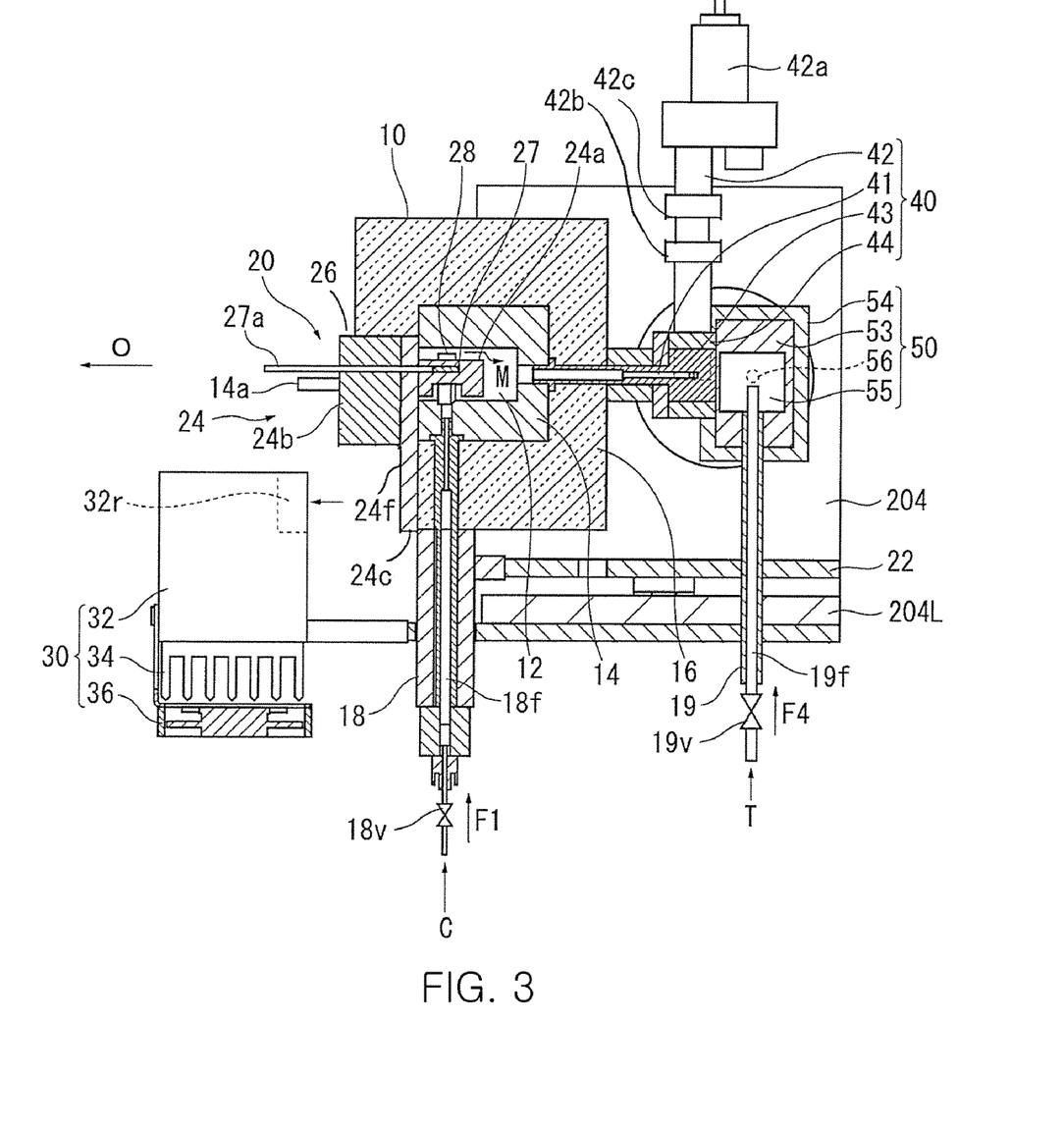
FIG. 3 is a vertical cross-sectional view showing the configuration of the gas evolving unit.
Figure 4:
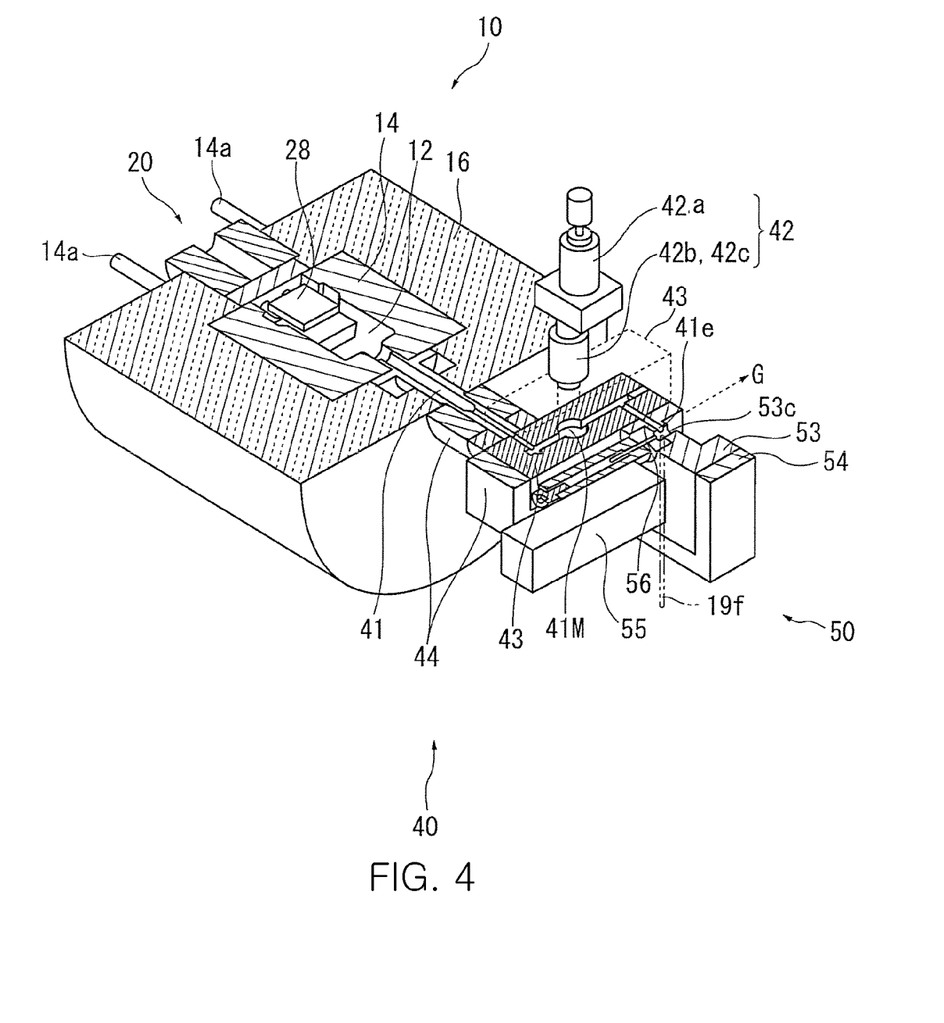
FIG. 4 is a transverse cross-sectional view showing the configuration of the gas evolving unit.
Figure 5:
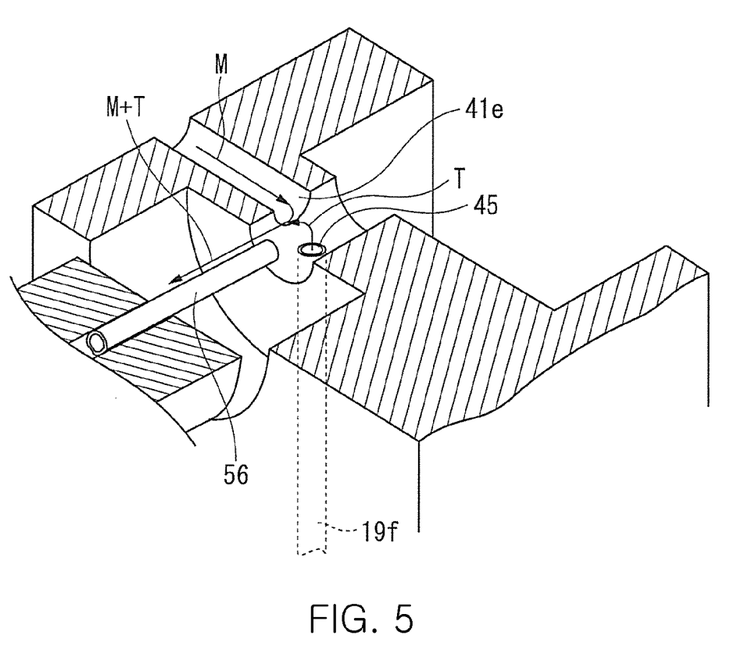
FIG. 5 is a partially enlarged view of FIG. 4.

Hereinafter, the exemplary embodiment of the present invention will be described with reference to the accompanying drawings. FIG. 1 is a perspective view showing a configuration of an apparatus for mass analysis 200 related to an embodiment of the present invention; FIG. 2 is a perspective view showing a configuration of a gas evolving unit 100; FIG. 3 is a vertical cross-sectional view showing the configuration of the gas evolving unit 100 taken along an axis O; FIG. 4 is a cross-sectional view showing the configuration of the gas evolving unit 100 on the axis O; and FIG. 5 is a partially enlarged view of FIG. 4.

The apparatus for mass analysis 200 is provided with the following: a body unit 202 which is a housing; a box-shaped attaching unit 204 for a gas evolving unit, the attaching unit 204 attached to a front of the body unit 202; a computer (control unit) 210 controlling the entire apparatus; and a mass spectrometer 110. The computer 210 is provided with a CPU for processing data; a memory unit 215 storing a computer program and data, such as a hard disk; a monitor; and an input unit such as a keyboard.

The attaching unit 204 for the gas evolving unit stores the gas evolving unit 100 as an assembly therein, the gas evolving unit including a cylindrical furnace (heating unit) 10, a sample holder 20, a cooling unit 30, a splitter 40 splitting gas, an ion source 50, and an inert gas flow path 19f. In addition, the body unit 202 stores the mass spectrometer 110 analyzing gas components evolved by heating a sample.

As shown in FIG. 1, the attaching unit 204 for the gas evolving unit is provided with an opening 204h extending from upper to front surfaces thereof. The sample holder 20 is located on the opening 204h by moving toward a discharging position (which will be described below) that is located at an outside of the furnace 10. Thus, a sample is supplied to or removed from the sample holder 20 through the opening 204h. In addition, the attaching unit 204 for the gas evolving unit is provided with a slit 204s at the front surface thereof. By horizontally moving an opening/closing handle 22H exposed to an outside through the slit 204s, the sample holder 20 is moved into or discharged from the furnace such that the sample holder 20 is set at the above-described discharging position to supply or remove the sample.

In addition, for example, when the sample holder 20 is moved on a moving rail 204L (which will be described below) by a stepping motor, etc. controlled by the computer 210, the sample holder 20 may be automatically moved into and discharged from the furnace 10.

Hereinafter, each component in the configuration of the gas evolving unit 100 will be described with reference to FIGS. 2 to 6.

The furnace 10 is attached to an attaching plate 204a of the attaching unit 204 for the gas evolving unit to be parallel to the axis O. The furnace 10 includes a heating chamber 12 having an approximate cylindrical shape and being open on the basis of the axis O, a heating block 14, and a heat retaining jacket 16.

The heat retaining jacket 16 surrounds the heating block 14, and the heating block 14 surrounds the heating chamber 12. The heating block 14 is made of aluminum, and is heated by electricity obtained from a pair of heating electrodes 14a extending from the furnace 10 to outside in a direction of the axis O as shown in FIG. 4.

In addition, the attaching plate 204a extends in a direction perpendicular to the axis O. The splitter 40 and the ion source 50 are attached to the furnace 10. In addition, a supporter 204b extends in a vertical direction of the attaching unit 204 for the gas evolving unit and supports the ion source 50.

The splitter 40 is connected to a second side (right side of FIG. 3) of the furnace 10, which is opposite to a first side, which is an opening side of the furnace 10. In addition, a carrier gas protecting pipe 18 is connected to a lower portion of the furnace 10, and stores a carrier gas channel 18f therein, the carrier gas channel 18f being connected to a lower surface of the heating chamber 12 and introducing carrier gas C to the heating chamber 12 therethrough. In addition, the carrier gas channel 18f is provided with a valve 18v controlling a flow rate F1 of the carrier gas C.

Furthermore, a mixed gas channel 41 communicates with the second side (right side of FIG. 3) of the heating chamber 12 such that mixed gas M of gas component G evolved from the furnace 10 (heating chamber 12) and the carrier gas C flows in the mixed gas channel 41. A detailed description will be provided later.

Meanwhile, as shown in FIG. 3, the ion source 50 is connected to the inert gas protecting pipe 19 at a lower side thereof, and the inert gas protecting pipe 19 stores the inert gas flow path 19f through which inert gas T is introduced into the ion source 50. In addition, the inert gas flow path 19f is provided with a valve 19v controlling a flow rate F4 of the inert gas T.

The sample holder 20 is provided with the following: a stage 22 moving on the moving rail 204L attached to an inner upper surface of the attaching unit 204 for the gas evolving unit; a bracket 24c attached on the stage 22 and extending vertically; insulators 24b and 26 attached to a front surface (left side of FIG. 3) of the bracket 24c; a sample holding unit 24a extending from the bracket 24c to the heating chamber 12 in the direction of the axis O; a sample heater 27 provided immediately below the sample holding unit 24a; and a sample plate 28 provided on an upper surface of the sample holding unit 24a and above the sample heater 27 and on which the sample is placed.

Here, the moving rail 204L extends in the direction of the axis O (horizontal direction in FIG. 3), and the sample holder 20 moves back and forth by the stage 22 in the direction of the axis O. In addition, the opening/closing handle 22H is attached to the stage 22 and extends in the direction perpendicular to the axis O.

In addition, the bracket 24c has a long rectangular shape having a semicircular upper portion. The insulator 24b has an approximately cylindrical shape and is provided at a front surface of the upper portion of the bracket 24c, and an electrode 27a of the sample heater 27 penetrates the insulator 24b and protrudes to outside the gas evolving unit. The insulator 26 has an approximately rectangular shape and is provided at the front surface of the bracket 24c and below the insulator 24b. In addition, a lower portion of the bracket 24c is not provided with the insulator 26 such that a front surface of the lower portion of the bracket 24c is uncovered to provide a contact surface 24f.

The bracket 24c has a diameter slightly larger than that of the heating chamber 12 such that the bracket 24c seals the heating chamber 12 tightly, and the heating chamber 12 stores the sample holding unit 24a therein.

In addition, a sample placed on the sample plate 28 of the heating chamber 12 is heated in the furnace 10 such that a gas component G is evolved.

The cooling unit 30 is disposed at an outside of the furnace 10 (left side of the furnace 10 in FIG. 3) to face the bracket 24c of the sample holder 20. The cooling unit 30 is provided with a cooling block 32 having a rectangular shape and having a recessed portion 32r; cooling fins 34 connected to a lower surface of the cooling block 32; and a pneumatic cooling fan 36 connected to a lower surface of the cooling fins 34 and blowing air to the cooling fins 34.

In addition, when the sample holder 20 moves in the direction of the axis O on the moving rail 204L toward a left side of FIG. 3 and comes out of the furnace 10, the contact surface 24f of the bracket 24c is positioned at and contacts with the recessed portion 32r of the cooling block 32. Accordingly, a heat of the bracket 24c is removed by the cooling block 32 whereby the sample holder 20 (particularly, the sample holding unit 24a) is cooled.

As shown in FIGS. 3 and 4, the splitter 40 is provided with the above-described mixed gas channel 41 communicating with the heating chamber 12; a branching channel 42 communicating with the mixed gas channel 41 and being exposed to the outside of the gas evolving unit; a back pressure valve 42a connected to a discharge side of the branching channel 42 to control a back pressure of the mixed gas M discharged through the branching channel 42; a housing unit 43 having an end of the mixed gas channel 41 inside thereof; and a heat retaining unit 44 surrounding the housing unit 43.

In addition, a filter 42b and a flowmeter 42c is disposed between the branching channel 42 and the back pressure valve 42a in the embodiment, the filter 42b removing impurities in the mixed gas. An end of the branching channel 42 may be exposed without a valve for controlling a back pressure, such as back pressure valve 42a, etc.

As shown in FIG. 4, when viewed from the top, the mixed gas channel 41 is connected to the heating chamber 12 and extends in the direction of the axis O. Then, the mixed gas channel 41 bends in a direction perpendicular to the axis O and bends again in the direction of the axis O such that the mixed gas channel 41 reaches an end part 41e and has a crank shape. In addition, a portion of the mixed gas channel 41 that extends in the direction perpendicular to the axis O is provided with a center thereof having an enlarged diameter to define a branch chamber 41M. The branch chamber 41M extends to an upper surface of the housing unit 43 and is fitted with the branching channel 42 having a diameter slightly smaller than that of the branch chamber 41M.

The mixed gas channel 41 may have a straight line, which is connected to the heating chamber 12, extends in the direction of the axis O, and reaches to an end part 41e. Alternatively, the mixed gas channel 41 may be a curved shape, or a linear shape having a predetermined angle with the axis O, etc., depending on a positional relationship with the heating chamber 12 or with the ion source 50.

As shown in FIGS. 3 and 4, the ion source 50 is provided with an ionizer housing unit 53, an ionizer heat retaining unit 54 surrounding the ionizer housing unit 53, a discharge needle 56, and a staying unit 55 fixing the discharge needle 56. The ionizer housing unit 53 has a plate shape, and a surface thereof is parallel to the axis O and is penetrated by a small hole 53c at the center thereof. In addition, the end part 41e of the mixed gas channel 41 penetrates the ionizer housing unit 53 and faces a side wall of the small hole 53c. Meanwhile, the discharge needle 56 extends in a direction perpendicular to the axis O and faces the small hole 53c.

As shown in FIGS. 4 and 5, the inert gas flow path 19f penetrates the ionizer housing unit 53 vertically, and a front end of the inert gas flow path 19f faces a bottom surface of the small hole 53c of the ionizer housing unit 53 and provides a junction 45 joining the end part 41e of the mixed gas channel 41.

In addition, with regard to the mixed gas M introduced from the end part 41e to the junction 45, which is near the small hole 53c, the mixed gas M is mixed with the inert gas T introduced from the inert gas flow path 19f such that combined gas (M+T) flows toward the discharge needle 56 and the gas component G among the combined gas (M+T) is ionized by the discharge needle 56.

The ion source 50 is a well-known device. According to the embodiment of the present invention, atmospheric pressure chemical ionization (APCI) is applied to the ion source 50. APCI causes minimal fragmentation of the gas component G such that fragmentation peak does not occur. Therefore, it is possible to detect the measurement target without separating the gas component G by using a chromatograph, etc.

The gas component G ionized at the ion source 50, the carrier gas C, and the inert gas T are introduced to the mass spectrometer 110 and analyzed.

The ion source 50 is stored in the ionizer heat retaining unit 54.

Figure 6:
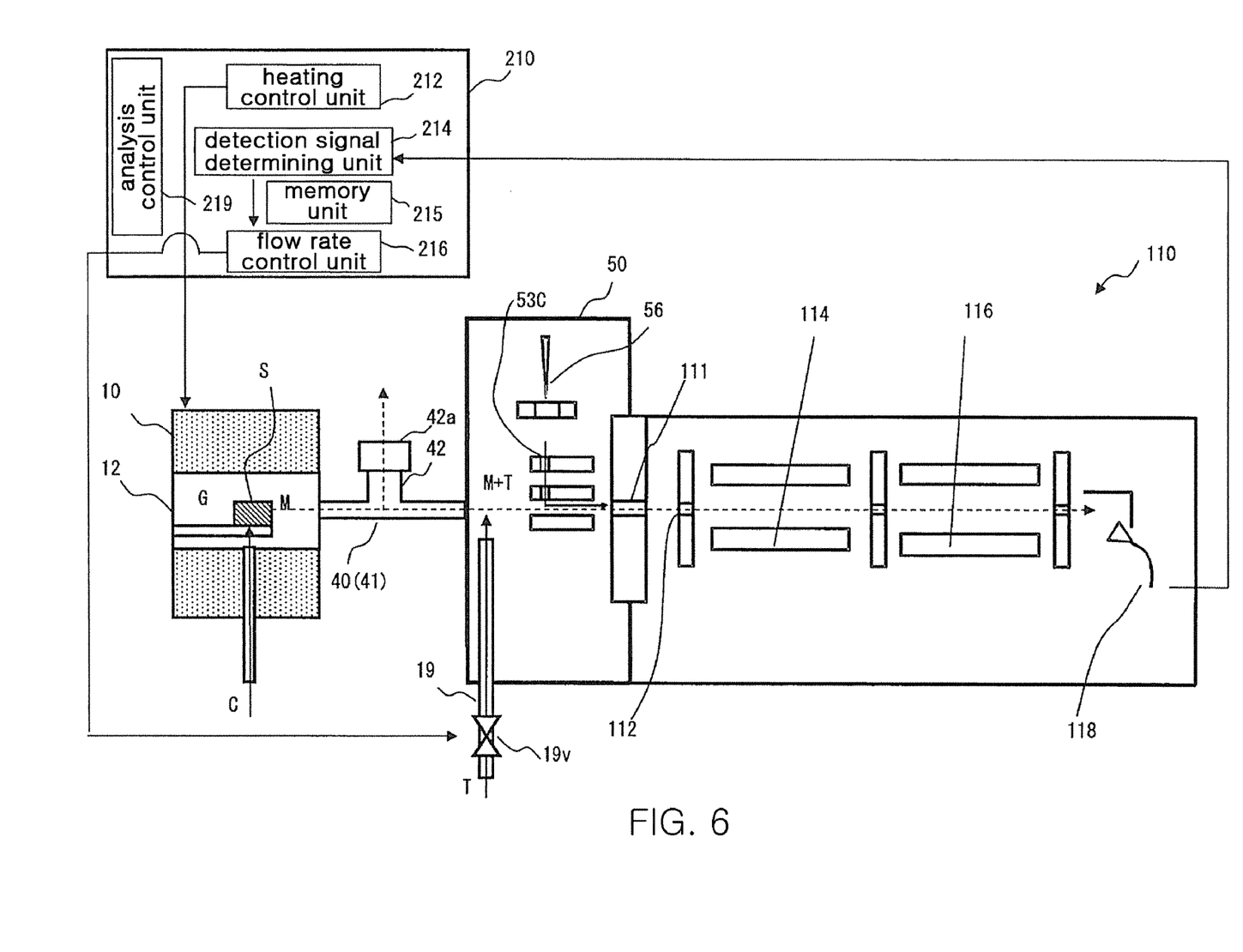
FIG. 6 is a block diagram showing a process of analyzing a gas component by the apparatus for mass analysis.

FIG. 6 is a block diagram showing a process of analyzing a gas component by the apparatus for mass analysis 200.

A sample S is heated in the heating chamber 12 of the furnace 10, and the gas component G is evolved. A heating condition (temperature rising rate, maximum temperature, etc.) of the furnace 10 is controlled by a heating control unit 212 of the computer 210.

The gas component G is mixed with the carrier gas C introduced in the heating chamber 12 to be the mixed gas M. The mixed gas M is introduced in the splitter 40 and some of the mixed gas M is discharged to outside through the branching channel 42.

A remaining mixed gas M and the inert gas T introduced from the inert gas flow path 19f are introduced to the ion source 50 as the combined gas (M+T), and the gas component G is ionized.

A detection signal determining unit 214 of the computer 210 receives a detection signal from a detector 118 (which will be described later) of the mass spectrometer 110 under a control of an analysis control unit 219.

A flow rate control unit 216 determines whether peak intensity of the detection signal received from the detection signal determining unit 214 is within a threshold range. When the peak intensity is out of the threshold range, the flow rate control unit 216 controls an opening ratio of the valve 19v such that a flow rate of the mixed gas M discharged from the splitter 40 to the outside through the branching channel 42, and further, a flow rate of the mixed gas M introduced from the mixed gas channel 41 to the ion source is controlled, whereby a detection accuracy mass spectrometer 110 is maintained optimally.

The mass spectrometer 110 is provided with a first aperture 111 through which the gas component G ionized at the ion source 50 is introduced; a second aperture 112 through which the gas component G flows after the first aperture 111; an ion guide 114; a quadrupole mass filter 116; and the detector 118 detecting the gas component G discharged from the quadrupole mass filter 116.

The quadrupole mass filter 116 varies an applying high frequency voltage such that mass is scanned. The quadrupole mass filter 116 generates a quadrupole electric field, and detects ions by moving the ions like a pendulum swinging within the quadrupole electric field. The quadrupole mass filter 116 serves as a mass separator passing only the gas component G within a predetermined mass range such that the detector 118 may identify and quantify the gas component G.

In addition, in the embodiment, because the inert gas T flows to the mixed gas channel 41 from a downstream of the branching channel 42, the inert gas T becomes a flow resistance which suppresses the flow rate of the mixed gas M introduced to the mass spectrometer 110 such that the inert gas T controls the flow rate of the mixed gas M discharged from the branching channel 42. In detail, as the flow rate of the inert gas T increases, the flow rate of the mixed gas M discharged from the branching channel 42 increases.

Accordingly, when a large amount of gas component is evolved and a gas concentration becomes too high, the flow rate of the mixed gas discharged from the branching channel to the outside is allowed to be increased to prevent a detection signal from exceeding a detection range of the detector, whereby the measurement can be accurate.

Hereinafter, characteristics of the present invention will be described with reference to FIG. 7. In addition, it is assumed that phthalate esters are a first substance, and a brominated flame retardant substance is a second substance. In addition, vinyl chloride is used as a sample, vinyl chloride containing phthalate esters as a plasticizer and containing the brominated flame retardant substance.

Figure 7:
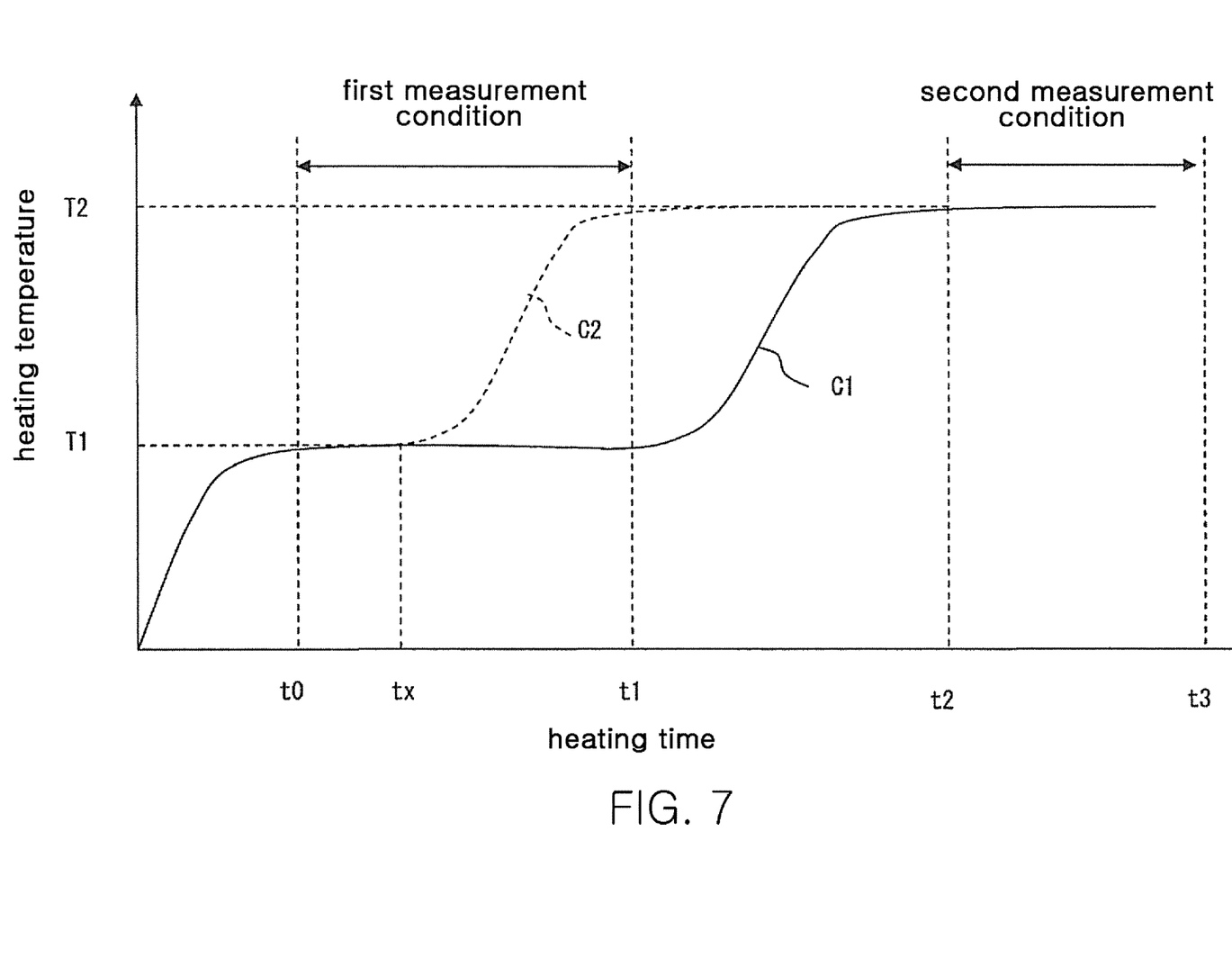
FIG. 7 is a timing chart showing a heating pattern of a heating unit and an operation of an analysis control unit.

FIG. 7 is a timing chart showing a heating pattern of the heating unit and an operation of the analysis control unit.

A reference sample of vinyl chloride containing a known amount of the phthalate esters and the brominated flame retardant substance is prepared in advance. A heating pattern C1 of FIG. 7 is prepared. Specifically, a first temperature point T1 at which gas of the phthalate esters is evolved and gas of the brominated flame retardant substance is not evolved and a first time point t1 at which the first temperature point T1 is maintained are obtained by mass analysis. Here, in the case of a heating pattern C2 in which a time tx for maintaining the first temperature point T1 is short and the sample is rapidly heated to a second temperature point T2, the phthalate esters and the brominated flame retardant substance are present together and gasified after the time tx such that it becomes difficult to separate and analyze the phthalate esters and the brominated flame retardant substance. Then, the second temperature point T2 at which the gas of the brominated flame retardant substance is evolved is obtained.

Then, the heating pattern C1 (the first temperature point T1 and the first time point t1) is stored in the memory unit 215.

Then, an actual measurement is performed. The heating control unit 212 reads the heating pattern C1 of the memory unit 215 and heats the furnace 10 at the first temperature point T1 until the first time point t1.

Based on the control of the heating control unit 212, the analysis control unit 219 controls to perform mass analysis under a first measurement condition during a time period heated by the first temperature point T1 (i.e., a period from the time t0 at which the first temperature point T1 is reached to the first time point t1).

The first measurement condition and a second measurement condition which will be described later are various measurement conditions for mass analysis. For example, the measurement conditions include an ionization voltage of the ion source 50, information on the opening ratio of the valve 19v according to the flow rate control unit 216 (i.e., the flow rate of the mixed gas M introduced into the ion source 50), etc. The measurement conditions are different measurement parameters for phthalate esters and for brominated flame retardant substances. That is, the first measurement condition and the second measurement condition are the measurement parameters assigned to the phthalate esters and the brominated flame retardant substance, respectively.

The first measurement condition and the second measurement condition are stored in the memory unit 215.

Then, the heating control unit 212 stops mass analysis when the first time point t1 is reached, and heats the furnace 10 until a temperature thereof reaches the second temperature point T2.

Based on the control of the heating control unit 212, the analysis control unit 219 controls to perform mass analysis under the second measurement condition starting from the time t2 at which the second temperature point T2 is reached. After time t3, the heating control unit 212 controls to stop heating, and the analysis control unit 219 controls to stop mass analysis.

As described above, the first temperature point T1 and the first time point t1 are obtained in advance at which gas of the phthalate esters is evolved and gas of the brominated flame retardant substance is not evolve and then the furnace 10 is heated at the first temperature point T1 until reaching the first time point t1 such that gas component of the phthalate esters can be mass-analyzed without the brominated flame retardant substance. Then, the furnace 10 is heated until reaching the second temperature point T2 at which gas of the brominated flame retardant substance is evolved such that gas component of the brominated flame retardant substance only after the gas of the phthalate esters is completely released can be mass-analyzed.

Thus, according to the heating pattern obtained in advance, two or more substances having different gasification temperatures can be mass-analyzed in a short time.

The present invention is not limited to the above embodiment. Accordingly, it should be understood that the present invention includes various modifications, equivalents, additions, and substitutions without departing from the scope and spirit of the invention.

For example, there is a possibility that the gas of the phthalate esters is not completely evolved even after the first time point t1 obtained beforehand due to fluctuations in the measurement conditions. Therefore, the analysis control unit 219 monitors a predetermined peak intensity derived from the phthalate esters during mass analysis and determines whether the peak intensity becomes equal to or below a threshold value. When the peak intensity is over the threshold value, the analysis control unit 219 may control to extend the first time point t1 for mass analysis to be continued. In this case, when the sample contains impurities different from the first substance and the second substance having a gasification temperature equal to or below the first temperature point, the impurities can be reliably removed at the first temperature point On the other hand, when time until the peak intensity becomes less than the threshold value is shorter than the first time point t1, the measurement time can be shortened.

The first material and the second material are not limited to the above embodiments, and the first material and the second material may be a plurality of materials, respectively. For example, there may be two first materials and one second material.

The first measurement condition and the second measurement condition are not limited to the above embodiments, and there may be three or more measurement conditions.

What is claimed is:

1. An apparatus for mass analysis, the apparatus comprising:
  a heating unit heating a sample containing a first substance and a second substance, which gasifies at a higher temperature compared to the first substance, to evolve gas components which are detected by the apparatus for mass analysis;
  a heating control unit controlling the heating unit to heat the sample at a first temperature point at which gas of the first substance is evolved and gas of the second substance is not evolved, until reaching a first time point, and when the first time point is past, controlling the heating unit to heat the sample until a second temperature point which is higher than the first temperature point and at which gas of the second substance is evolved, is reached, the first temperature point and the first time point being obtained beforehand; and
  an analysis control unit performing mass analysis under a first measurement condition assigned to the first substance until reaching the first time point at the first temperature point, and performing mass analysis under a second measurement condition assigned to the second substance at the second temperature point.

2. The apparatus of claim 1, wherein, when the analysis control unit performs mass analysis of the first substance under the first measurement condition, the first time point is determined to be a point at which a peak intensity of the first substance is equal or less than a predetermined threshold value.

3. The apparatus of claim 1, wherein the first substance is phthalate ester and the second substance is bromide.

4. A method of mass analysis using an apparatus provided with a heating unit heating a sample containing a first substance and a second substance which gasifies at a higher temperature compared to the first substance to evolve gas components which are detected by the apparatus for mass analysis, the method comprising:
  a heating control process in which the heating unit is controlled to heat the sample at a first temperature point at which gas of the first substance is evolved and gas of the second substance is not evolved, until reaching a first time point, and when the first time point is past, the heating unit is controlled to heat the sample until reaching a second temperature point which is higher than the first temperature point and at which gas of the second substance is evolved, is reached, the first temperature point and the first time point being obtained beforehand; and
  an analysis control process in which mass analysis is performed under a first measurement condition assigned to the first substance until reaching the first time point at the first temperature point, and mass analysis is performed under a second measurement condition assigned to the second substance at the second temperature point.

* * * * *